United States Patent [19]

Mody et al.

[11] Patent Number: 5,339,237

[45] Date of Patent: Aug. 16, 1994

[54] METHOD FOR INTERLOCK TRACING FOR DISCRETE DEVICES IN A PROCESS CONTROL SYSTEM

[75] Inventors: Pankaj H. Mody, Maple Glen; Richard P. Himmer, Blue Bell; John J. Herman, Ft. Washington, all of Pa.

[73] Assignee: Honeywell Inc., Minneapolis, Minn.

[21] Appl. No.: 41,257

[22] Filed: Apr. 1, 1993

[51] Int. Cl.$^5$ ................................................ G05B 9/02
[52] U.S. Cl. ...................... 364/184; 371/14; 371/16.5
[58] Field of Search ............................ 364/184–187, 364/499–500, 550, 570, 580, 140, 141, 147, 188–192; 371/3, 16.5, 14; 395/575

[56] References Cited

U.S. PATENT DOCUMENTS

| | | | |
|---|---|---|---|
| 4,835,670 | 5/1989 | Adams et al. | 364/184 |
| 4,852,046 | 7/1989 | Jones et al. | 364/184 |
| 4,908,188 | 3/1990 | Jefferis, III et al. | 364/499 |
| 5,128,857 | 7/1992 | Okada et al. | 364/140 |
| 5,177,420 | 1/1993 | Wada et al. | 364/147 |

*Primary Examiner*—Jerry Smith
*Assistant Examiner*—Jim Trammell
*Attorney, Agent, or Firm*—A. A. Sapelli; W. Udseth

[57] ABSTRACT

When an interlock trip condition occurs, a back tracing of interlock logic occurs by examining input signals to an output gate of the interlock logic to determine which input signal caused the interlock trip condition. If the input signal is a predetermined interlock condition, that signal is deemed to be the cause of the interlock trip, saved and displayed. If the input signal is the output of another gate, then the inputs to that gate are examined to determine which input signal caused that gate to switch state. This process is repeated until a predetermined interlock condition is found which has switched state. By knowing the structure of the interlock logic and knowing the state of logic signals outputted from the interlock logic, the determination is made and saved such that even if the predetermined interlock condition that caused the interlock trip subsequently changes state as a result of placing the device in a safe state, the cause of the interlock trip is ascertained and saved by this method.

6 Claims, 5 Drawing Sheets

METHOD FOR INTERLOCK TRACING FOR DISCRETE DEVICES IN A PROCESS CONTROL SYSTEM

BACKGROUND OF THE INVENTION

The present invention relates to control systems, and more particularly, to a method for determining a specific condition which causes an interlock to activate (or sometimes referred to as causing an interlock to trip).

All of the products on market today for implementing interlocks provide interlock logic displays that only show the current interlock conditions but provide no indication of which one of the many possible interlock conditions actually was responsible for causing an interlock trip.

Discrete devices in process control systems (e.g., pumps, motors, valves, etc.) are usually prevented from operating unsafely or incorrectly by means of interlocks. Process conditions, usually called interlock conditions, are conditions such as "furnace temperature greater than a SAFE value" or "boiler pressure too high" or "two of four pumps not operating for over 10 minutes". These are combined with logic, (most often, but not restricted to, Boolean or relay ladder logic language), usually called the interlock logic, in order to "force" the device to a SAFE state (if not already in that state) based on the process situation, and keep it in that state until the process conditions causing the interlock are returned to normal. The change of the device's operating state (e.g., stopping of a pump which was running, or opening of a pressure relief valve, etc.) due to interlock is often called interlock trip and not being allowed to operate is usually referred to as the device is interlocked.

Following an interlock trip it is important to identify the cause of the trip. Frequently the condition responsible for causing the trip may no longer exist and must be captured so the operator, possibly at a later time, can identify the cause and take the necessary corrective action.

Thus there is a need to provide a method whereby the cause of the interlock trip can be identified and captured so that it can be presented to the operator in a convenient manner and time. There is provided by the present invention a method in which the specific process condition that caused the interlock trip is identified by tracing back through the interlock logic and saved, such that even if the actual condition subsequently clears (or becomes OK) or if additional conditions (which may be different from the conditions at the time of the initial interlock trip) are now present the operator can unambiguously tell the original cause of the interlock trip from the operational display of the discrete device without resorting to system logs or journaling mechanisms.

SUMMARY OF THE INVENTION

Therefore, there is provided by the present invention, a method for determining the specific interlock condition responsible for causing an interlock trip. In a process control system, there are included devices for controlling a process. Further, there is associated with predetermined devices, an interlock system which includes interlock logic for defining an interlock strategy. Interlock logic of each of the predetermined devices provides an interlock signal to a function logic block which represents the device in the process control system. Further, interlock conditions are indicated by a plurality of logic signals which include Boolean signals coming directly from the process or derived from signals coming from the process. The interlock logic combines the interlock conditions to produce the interlock signal which in turn is used by a controller to command the device to go into a safe state. A method, for tracing back through the interlock logic to identify the predetermined condition which causes an interlock trip condition, comprises the steps of periodically updating the predetermined conditions and computing the overall interlock signal while keeping track of the changes such that a determination can be made if the interlock signal has changed state. If the interlock signal has changed state, a determination is made if the device is already in a safe state. If the device is already in a safe state, the method is exited. Otherwise, the source of the interlock signal from the logic signals is examined until the source is determined to be a predetermined condition signal. The predetermined condition signal is saved as the cause of the interlock trip, and the method is exited.

Accordingly, it is an object of the present invention to provide a method for identifying the cause of an interlock trip.

It is another object of the present invention to provide a method for identifying and capturing the cause of an interlock trip.

It is still another object of the present invention to provide a method for identifying and capturing the cause of an interlock trip for presentation to the operator in a time convenient manner even when the condition causing the interlock trip has changed.

These and other objects of the present invention will become more apparent when taken in conjunction with the following description and attached drawings, wherein like characters indicate like parts, and which drawings form a part of the present application.

DETAILED DESCRIPTION

Figure 1:
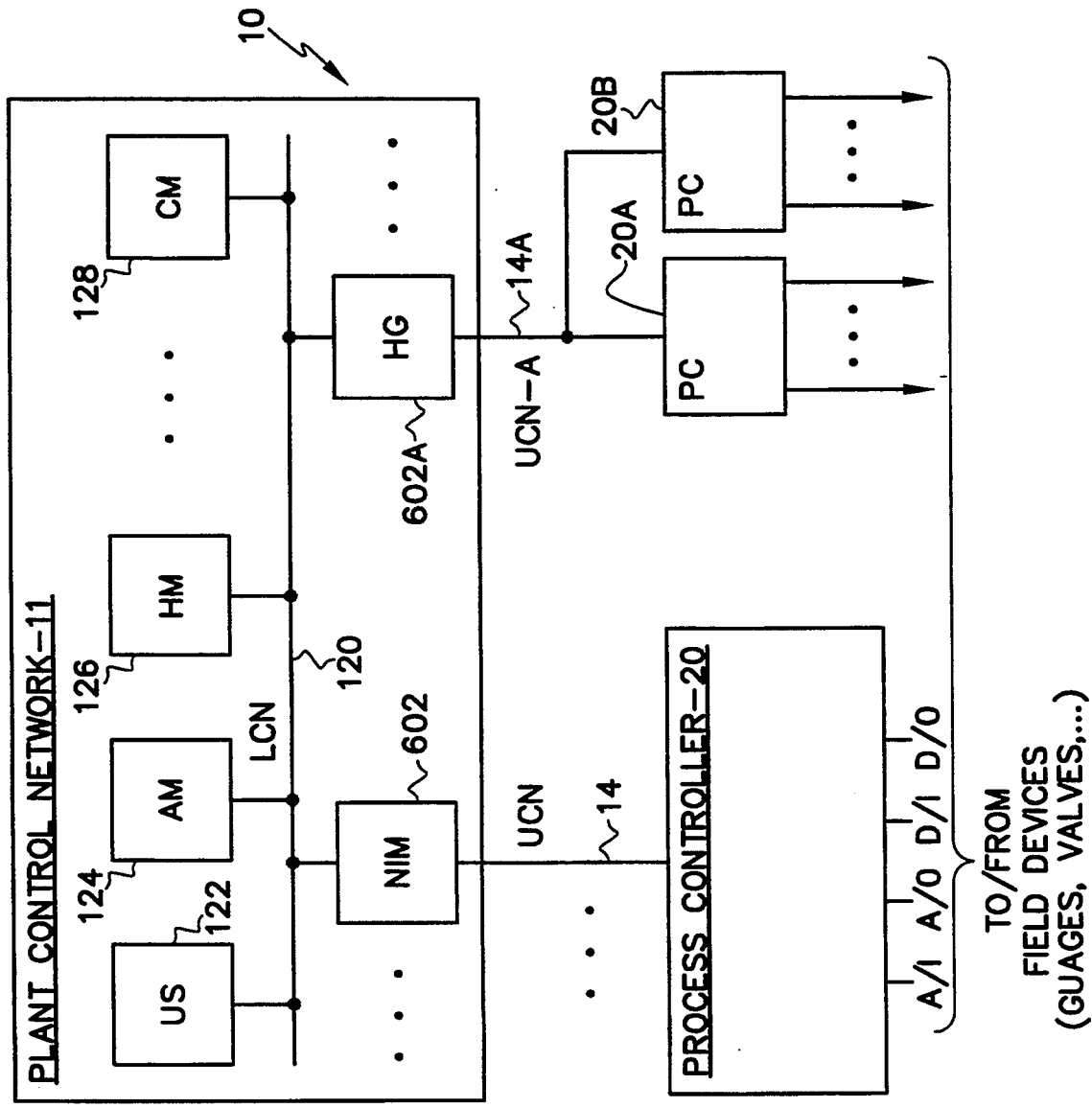
FIG. 1 shows a block diagram of a process control system containing a process controller in which the present invention can be utilized.

Before describing the method of the present invention, it will be helpful in understanding a system environment in which the present invention can be utilized. Referring to FIG. 1, there is shown a block diagram of a process control system 10 in which the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via the same UCN 14, and additional UCNs 14 can be added to the plant control network 11 via additional corresponding NIMs 602. The process controller 20, interfaces analog input and output signals, and digital input and output signals (A/I, A/O, D/I, and D/O, respectively) to the process control system 10 from the variety of field devices (not shown) which include, pumps, motors, valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
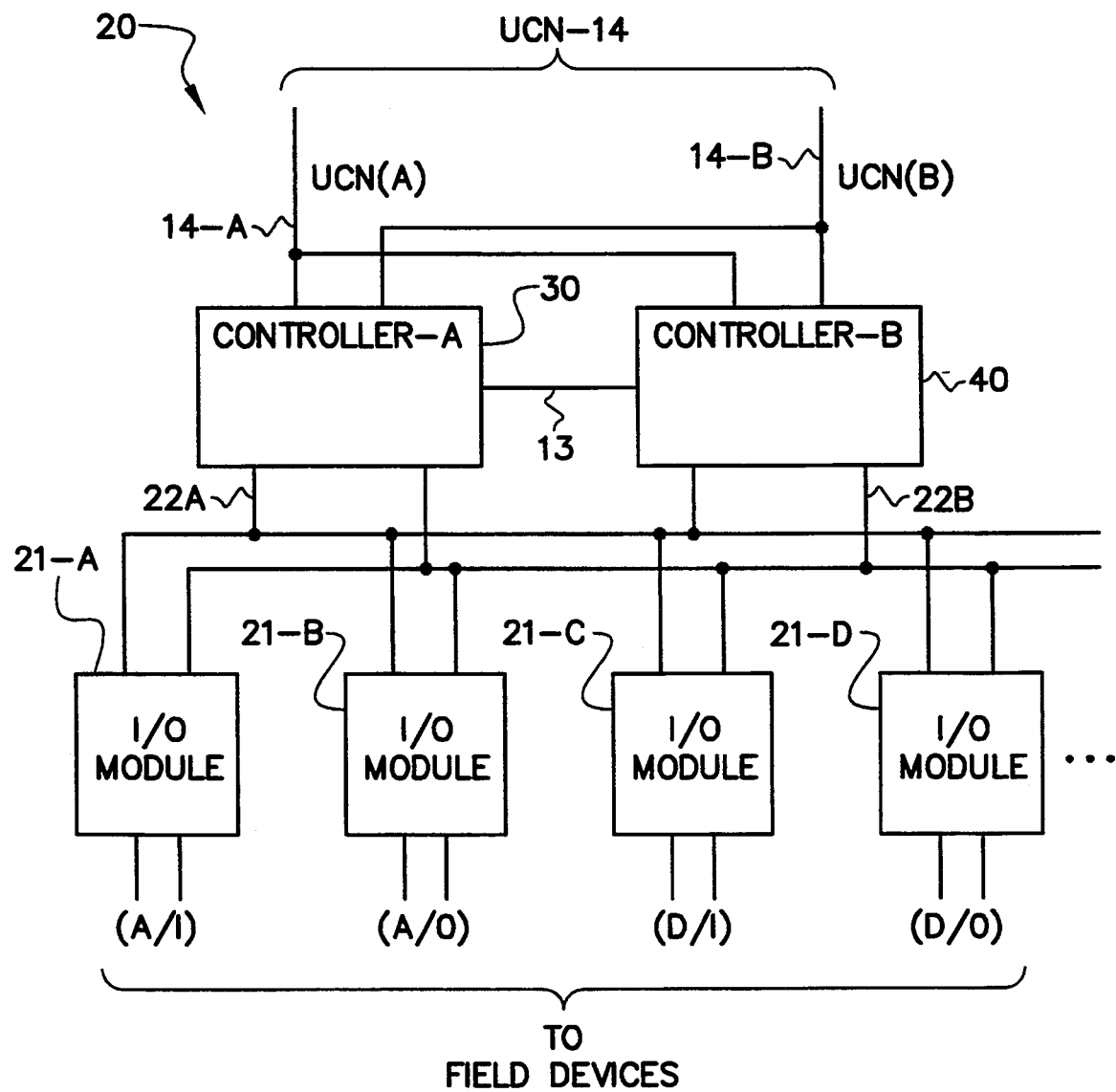
FIG. 2 shows a block diagram of the process controller, including I/O processor (IOP), in which the present invention can be utilized.

Referring to FIG. 2 there is shown a block diagram of the process controller 20. The preferred embodiment of the process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various pumps, motors, valves, pressure switches, pressure gauges, thermocouples, . . . which can be analog inputs (A/I), analog outputs (A/O), digital inputs (D/I), digital outputs (D/O), . . . . The controller A 30 and controller B 40 interface to one or more I/O modules via a bus 22, the bus 22 in the preferred embodiment, comprising for communication redundancy purposes, a bus 22A and a bus 22B.

On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20. A more complete description of process controller 20, which includes controller 30 and IOP 21, can be had by reference to U.S. Pat. No. 5,146,401.

Figure 3A:
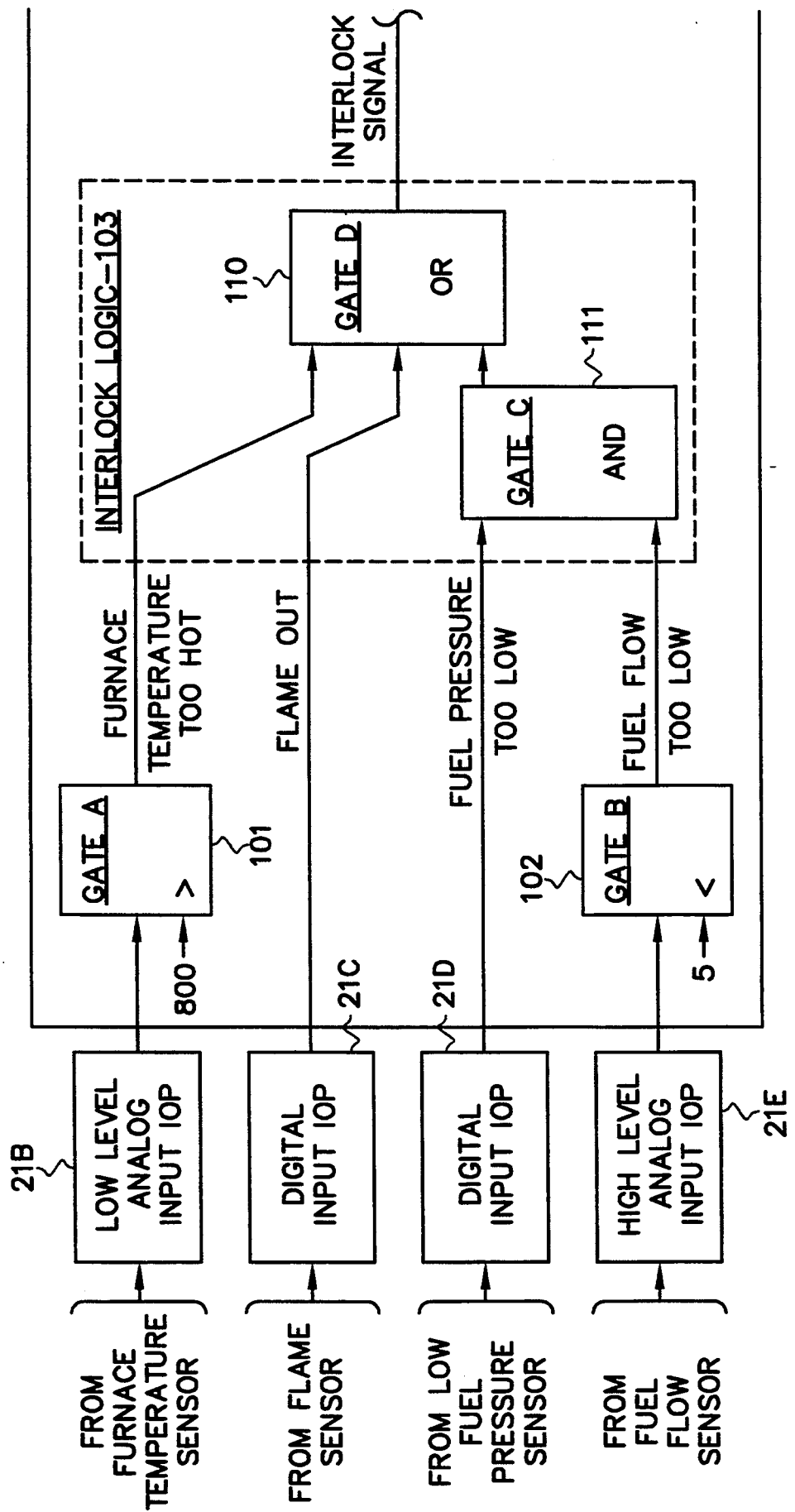
FIGS. 3a and 3b show a functional block diagram of an interlock system of field devices and its interface of the process control system.
Figure 3B:
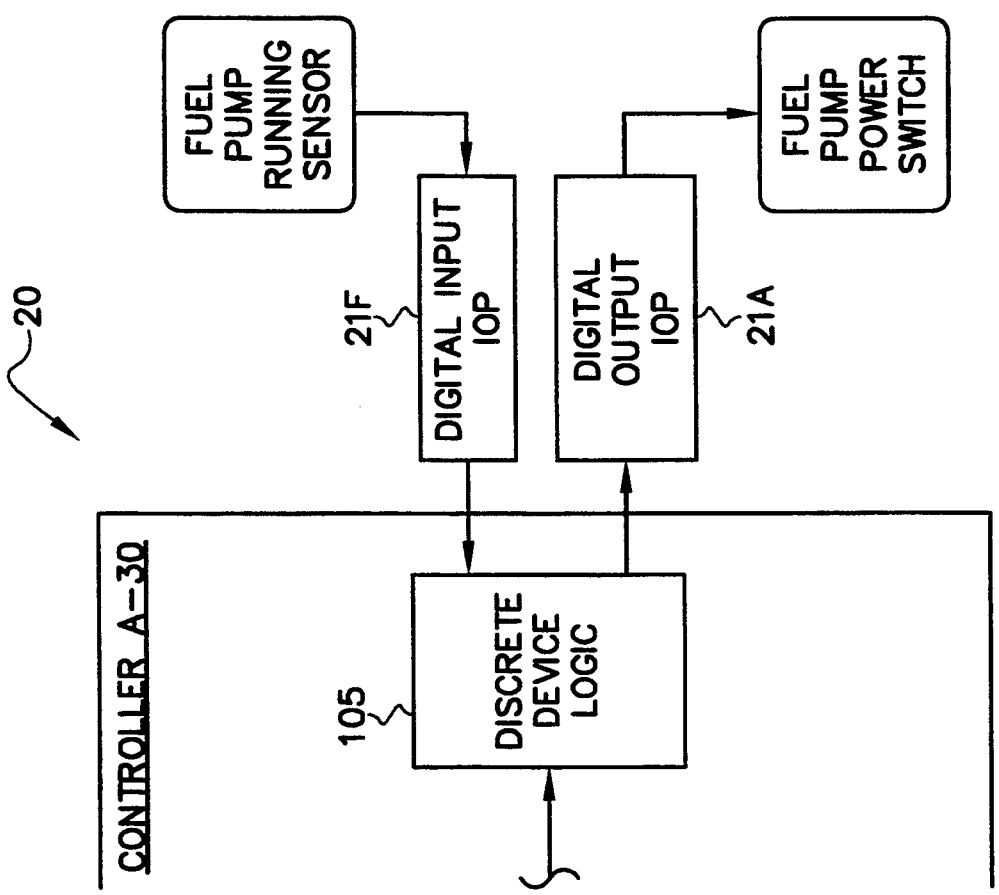

The method of the present invention will now be described. Referring to FIG. 3, there is shown a functional block diagram of an interlock system of a field device implemented in the process controller 20. Process controller 20 controls discrete devices (field devices) such as pumps, valves, motors, . . . . It is desired in controlling such devices to prevent them from operating in a way that may jeopardize the safety of humans, environment, or process equipment, or things such as product quality. Such undesirable operation of discrete devices is prevented by means of interlock control which, in the preferred embodiment of the present invention, is executed in the process controller 20.

a) Interlock control consists primarily of the discrete device—whose safe or proper operation is the purpose of the interlock strategy. These devices include pumps, valves, motor, . . . .

b) Interlock conditions—these are process conditions that when present either individually or in conjunction with other such conditions, may require the device to be in a certain state for safe or proper operation. These conditions are represented by signals from the various sensors, output, . . . of the field device (or often referred to herein simply as device).

c) Interlock logic—this is the logic that combines defined interlock conditions and determines if the device needs to be forced to a safe or proper state.

Each discrete device can be characterized as having a finite number of operating states, a valve may be opened or closed, a pump may be running or stopped, . . . . The example of FIG. 3 shows conditions associated with a single device, i.e., a fuel pump, used to supply fuel to a furnace. An output control signal from IOP 21A provides the control for the pump. Although not shown, it will be understood by one skilled in the art, that the value of the furnace temperature is provided to the process controller 20 via an appropriate IOP such that other devices (e.g., valves) can be controlled to provide a desired temperature. In the example of FIG. 3, only one interlock signal corresponding to the SAFE state of the pump is shown. The interlock signal is considered active when it is on (a logic 1 or high in digital terms). It will be understood by one skilled in the art that the choice of digital representation is not a limitation, and the example of FIG. 3 as being only a single interlock signal is also not a limitation of the present invention. When the interlock signal transitions from an OFF state to an ON state and the device is not in the SAFE state, it is forced to go to that state, by a control signal from the IOP 21A. The device is then said to have been tripped by a predefined interlock strategy. As long as the interlock signal is on, the device is forced to stay in the SAFE state. The device is then said to have been locked by the predefined interlock strategy.

In the example of FIG. 3, four conditions are defined;
a) FURNACE TEMP TOO HOT
b) FLAME OUT
c) FUEL PRESSURE TOO LOW, and
d) FUEL FLOW TOO LOW In the example, gate A 101 accepts a signal from the furnace temperature sensor through low level analog input IOP 21B If the temperature is greater than 800°, then the output signal of gate A indicates that the furnace temperature is above 800° and the signal transitions from a zero state to a logic one state signifying that the condition is active and in fact the furnace temperature is higher than the predefined amount. In a similar fashion the FLAME OUT signal is a signal directly inputted from a flame sensor to digital input IOP 21C. Likewise, the third condition is the fuel pressure is too low which is a signal derived from a fuel pressure monitoring system and inputted through digital input IOP 21D. When active, fuel pressure is below a predefined pressure amount. The last signal derives an input from a fuel flow sensor through high level analog input IOP 21E, and is inputted to a gate B 102 and compares the fuel flow rate to a predefined quantity, in this example a fuel of five (gallons per minute, liters per hour, ...) and if the fuel flow is below the predefined quantity, gate B 102 outputs a signal, a digital signal transitioning from logic zero state to a logic one state, which signifies the fuel flow is below a predetermined value. These signals, which are indicative or represent predefined conditions, are inputted to interlock logic 103. The interlock logic combines the number of interlock conditions (predefined conditions) with Boolean logic gates to produce a single binary interlock signal and feeds it to a device function logic block 105. As will be recognized by one skilled in the art there is no limitation on the number of interlock conditions, the number of Boolean logic gates, or how they are connected. The interlock logic essentially implements the predefined interlock strategy. Device function logic block 105 has the knowledge of whether the pump is running or not based on the state of the pump fed back through the digital input IOP 21F.

When the interlock signal transitions from OFF to ON, the device function logic block 105 checks if the pump is running, and if it is, sends a signal to it to stop, via the digital output IOP 21A. This is considered a trip situation since a running pump was stopped by an interlock. Anytime an interlock signal changes and generates a trip, the controller traces back through the interlock logic to identify the responsible condition. To enable this for each gate in the interlock logic, the controller saves in a data base an index of the input that caused the output of the gate to its most current state.

Thus, the controller can back trace through the Boolean gates of interlock logic 103 to identify the single input that caused the final result, the interlock signal, to transition to the ON state. Since the cause of the output change for each gate of the interlock logic 103 is saved, including the interlock conditions, the cause of the trip for later use by the operator or other systems function can be provided even though the condition may change. For example if the interlock signal is generated because the furnace temperature is too hot, and the furnace is turned off, at some later time, the furnace will have cooled to a point in which the furnace temperature is back to normal. In such a condition, unless the operator traces the cause of the trip immediately, potentially that information can ultimately be lost. As a result of storing the information in the controller A30 as provided by the method of the present invention, that information will be available at any point in time. Once the cause of the trip is determined, the controller A30 can transmit that information along with the fact that the trip occurred, to the operator at the universal station 122 of plant control network 11. In the interlock logic 103 AND—gates are included as one of the Boolean logic gates utilized, and as such both inputs must be active in order for the gate to output a logic 1. However, in the preferred embodiment of the present invention, a convention is utilized in which the last input which causes the AND gate to activate is defined as the condition or signal which causes the gate to switch.

Figure 4:
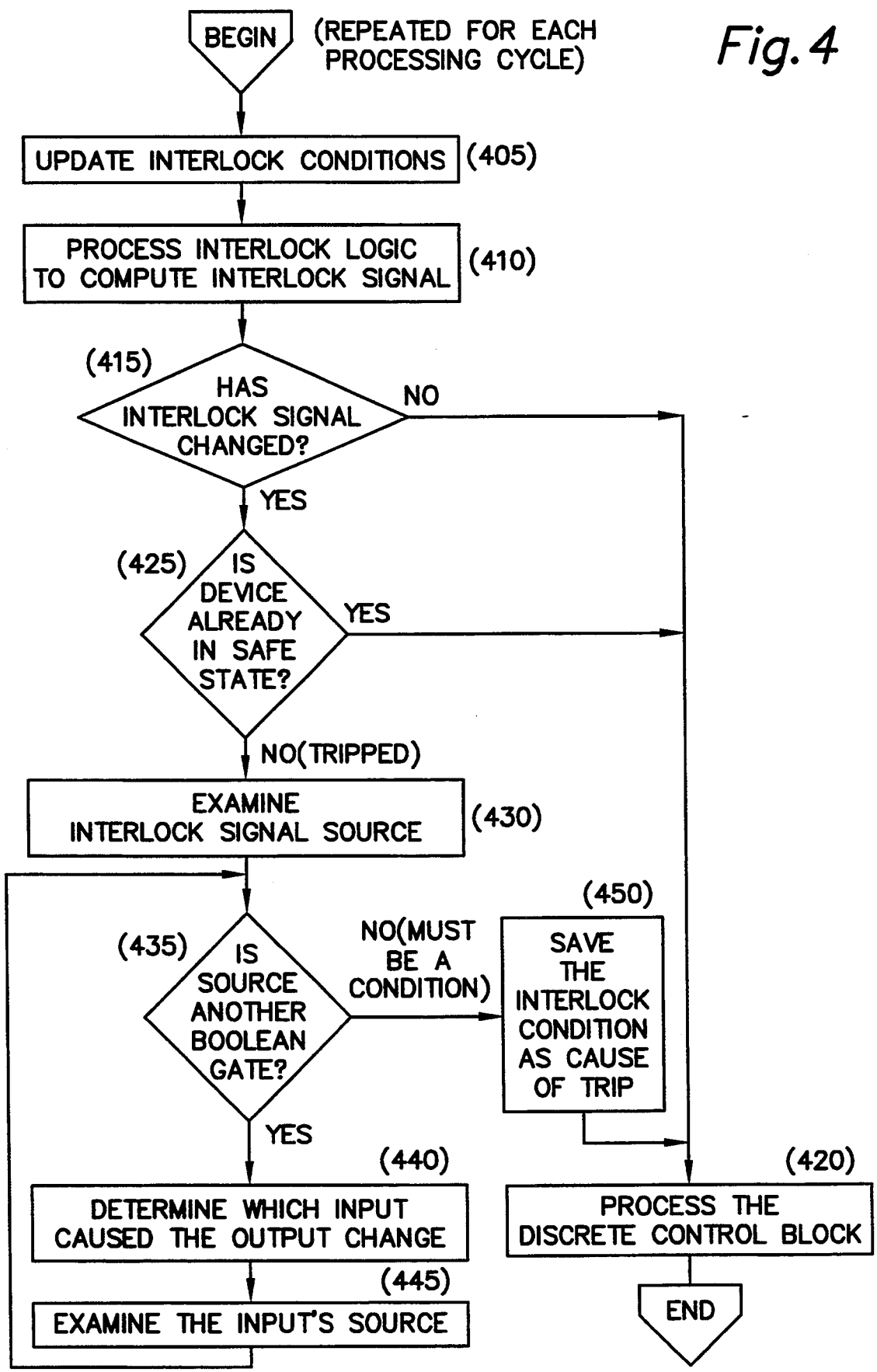
FIG. 4 shows a flow diagram of the method of the present invention.

Referring to FIG. 4 there is shown a flow chart of the method of the present invention. Periodically, the steps of the flow chart are repeated for each process cycle, a process cycle being defined by the process control system and can be a quarter second cycle, a half second cycle, .... Each of the interlock conditions are updated (block 405) by accepting the inputs from the IOPs and computing the preconditioning logic, if any, by the controller A30. The interlock logic 103 is processed by controller A30 (block 410). If the output of a gate has changed, then the controller A30 determines which input of the gate caused the output signal to change. As part of the processing, that ID of that input is stored. Controller A30 determines if the interlock signal has changed (block 415), and if the interlock signal has not changed the method proceeds to the normal processing, or permits the normal processing, of the discrete device function logic block 105 to be performed (block 420). If the interlock signal has changed, a determination is made if the device is already in the SAFE state (block 425). If the device is already in the SAFE state, the control processing is allowed to continue (block 420). If the device is not in the SAFE state, a trace back through the interlock logic 103 is started (block 430). By looking at the information stored in controller A30, a determination can be made if the source of the interlock signal is from another Boolean gate (block 435). Thus, in the example of FIG. 3, if the interlock signal has changed signifying the output of gate 110 has changed, based on the information stored in the data base, it can be determined (block 440) which input to the gate 110 has changed (block 445). If the input which cause the change is outputted from another gate 111 (block 435) the tracing process is repeated until the source of the change is not the output of another gate (block 435) and the interlock condition saved as the cause of the trip (block 450). The information, i.e., the interlock signal and the cause of the trip, can then be displayed to the operator and saved in the history module 126 of the process control network 11. The flow can then be repeated for each interlock signal. FIG. 4 shows a single loop through the process consistent with the single interlock signal of the example of FIG. 3.

While there has been shown what has been considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In a process control system, said process control system including devices for controlling a process, and further wherein there is associated with predetermined ones of said devices an interlock system which includes interlock logic for defining an interlock strategy, each interlock logic of each of the predetermined devices providing an interlock signal to a function logic block which represents the device in the process control system, and further wherein a plurality of logic signals indicate interlock conditions, the logic signals including Boolean signals directly from the process or derived from signals from the process, said interlock conditions being combined by the interlock logic thereby generating the interlock system, a method for tracing back through the interlock logic to identify a predetermined condition which causes an interlock trip condition, said method comprising the steps of:
   a) periodically updating the status of the predetermined conditions;
   b) determining a new status of the interlock signal from the updated status of the predetermining conditions;

c) remembering the updated status of the predetermined conditions;
d) determining if the interlock signal has changed state;
e) if the interlock signal has changed state, determining if the device is already in a safe state;
f) if the device is already in a safe state,
  i) exiting to step (h); otherwise
  ii) examining the source of the interlock signal from the logic signals until the source is determined to be a predetermined condition signal;
g) saving the predetermined condition signal as the cause of the interlock trip; and
h) exiting from the method.

2. A method for tracing back according to claim 1, wherein the step of examining the source of the interlock signal comprises the steps of:
  a) examining input signals, to an output gate which outputs the interlock signal to determine the input signal which caused the interlock signal to be generated;
  b) determining if the input signal which caused the interlock signal to be generated is from another gate of the interlock logic;
  c) if the input signal which caused the interlock signal to be generated is an output of an $i^{th}$ intermediate gate of the interlock logic, where i=1 to N, N being the number of gates in a logic path of the interlock logic,
    i) examining the input signals to the $i^{th}$ intermediate gate to determine the input signal to the $i^{th}$ intermediate gate which caused the $i^{th}$ intermediate gate to change state;
    ii) determining if the input signal to the $i^{th}$ intermediate gate which caused the $i^{th}$ intermediate gate to change state is from an i+1 intermediate gate or if it is a predetermined condition signal;
    iii) if the input signal to the $i^{th}$ gate is from an i+1 intermediate gate,
      1) repeating step (c,i), otherwise
      2) exiting to step (g) of claim 1; and
  d) if the input signal which caused the interlock signal to be generated is a predetermined condition signal, exiting to step (g) of claim 1.

3. A method for tracing back according to claim 2, wherein the step of exiting the method further comprises the steps of:
  a) processing data associated with the device; and
  b) when an interlock trip occurs, placing the device in a safe state if the device is not in a safe state and the interlock trip condition has occurred.

4. A method for tracing back according to claim 3, further comprising the steps of:
  a) displaying the interlock trip condition which as occurred to an operator; and
  b) displaying the predetermined condition which caused the interlock trip condition to occur to an operator.

5. A method for tracing back according to claim 2, further comprising the steps of:
  a) displaying the interlock trip condition which as occurred to an operator; and
  b) displaying the predetermined condition which caused the interlock trip condition to occur to an operator.

6. A method for tracing back according to claim 1, wherein the step of exiting further comprises the steps of:
  a) processing data associated with the device; and
  b) when an interlock trip occurs, placing the device in a safe state if the device is not in a safe state and the interlock trip condition has occurred.

* * * * *